United States Patent [19]
Hackett

[11] 3,842,604
[45] Oct. 22, 1974

[54] BOOSTER UNIT FOR VEHICLE HYDRAULIC BRAKE SYSTEMS

[75] Inventor: Norman Henry Hackett, Bondi, New South Wales, Australia

[73] Assignee: Norman Hackett Patents Holdings PTY. Limited, Sydney, New South Wales, Australia

[22] Filed: Apr. 10, 1972

[21] Appl. No.: 242,366

[52] U.S. Cl. ............................................... 60/563
[51] Int. Cl. ............................................. F15b 7/00
[58] Field of Search ...................................... 60/563

[56] References Cited
UNITED STATES PATENTS

| | | | |
|---|---|---|---|
| 2,463,173 | 3/1949 | Gunderson | 60/563 |
| 2,737,777 | 3/1956 | Krusemark | 60/563 |
| 2,813,399 | 11/1957 | Valentine | 60/563 |
| 3,406,519 | 10/1968 | Hackett | 60/563 |
| 3,466,870 | 9/1969 | Hackett | 60/563 |

Primary Examiner—Irwin C. Cohen
Assistant Examiner—A. M. Zupcic
Attorney, Agent, or Firm—Stevens, Davis, Miller & Mosher

[57] ABSTRACT

A booster unit for a conventional automobile brake system comprising an operating cylinder having an inner portion adapted for connection to the master cylinder of the system and an outer end portion adapted for connection to the brake applying means. The cylinder has a piston rod carrying a first piston at one end and a second piston at its other end. A second cylinder is inside the operating cylinder, around the second piston, forming a closed air chamber. Valve means permits fluid communication during an initial portion of a brake application and prevents fluid communication during the remainder of that application.

12 Claims, 12 Drawing Figures

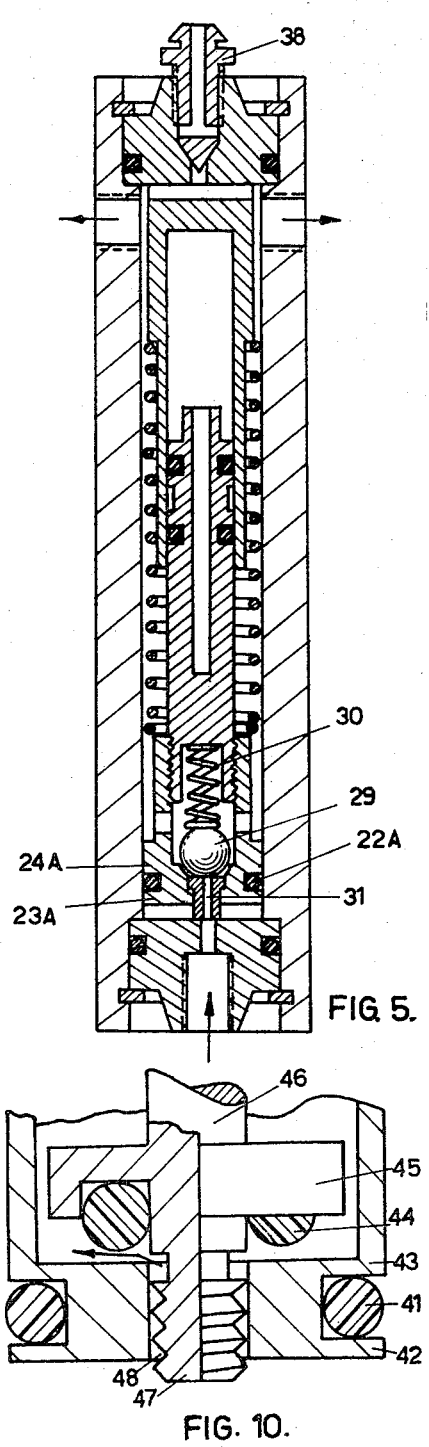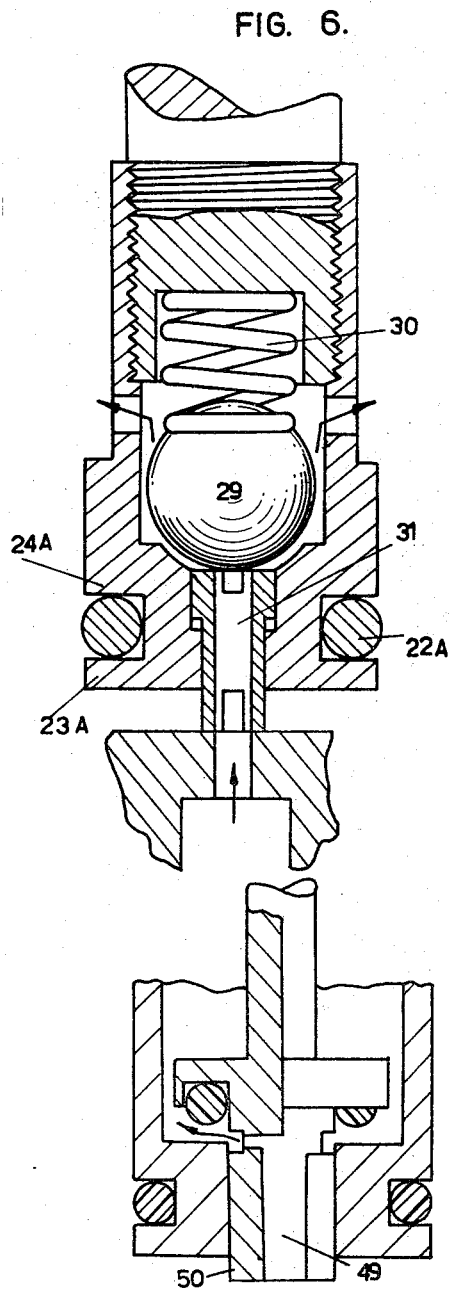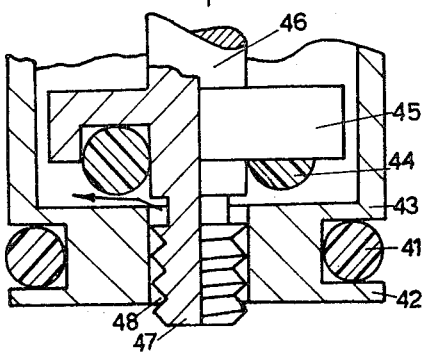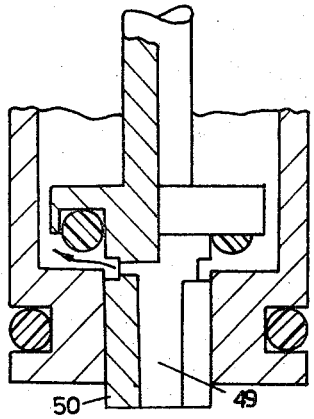

BOOSTER UNIT FOR VEHICLE HYDRAULIC BRAKE SYSTEMS

This invention relates to hydraulic brake systems for vehicles. Briefly stated, such systems comprise (a) a master cylinder incorporating a brake fluid reservoir and pedal operated means for putting fluid in the cylinder under pressure (b) fluid-pressure responsive brake-applying means associated with each vehicle wheel to be braked; and (c) pipe lines by which fluid pressure in the master cylinder is transmitted to the brake-applying means for the operation thereof. Such systems are hereinafter referred to as being "of the type described."

The main object of the invention is to provide a brake system of the kind described, with a simple and inexpensive booster unit which may be easily incorporated in the system at any convenient point in the pipe line so that, for a given force of brake application, less pedal pressure is required than would be necessary in the absence of the unit. A further object is to provide such a booster unit which incorporates simple means whereby the booster, while necessarily acting as a barrier to passage of fluid through it during a brake application, permits pressure-equalizing flow of fluid through it immediately following a brake application.

The invention consists in a booster unit for a brake system of the type described; comprising: an operating cylinder having an inner end portion adapted for pipe connection to the master cylinder of the system and an outer end portion adapted for pipe connection to the brake applying means of the system, a first piston in said operating cylinder disposed between said end portions, a piston rod which at one end carries said first piston and at its other end is formed as a second piston, a second cylinder inside said operating cylinder within which said second piston engages to form a closed air chamber, and a by-pass valve so associated with said first piston as to prevent fluid communication between said end portions during a brake application and to permit such communication when the brake is not applied.

Examples of the invention are illustrated in the drawings herewith.

FIG. 1 is a diagrammatic view showing a brake system of the type described with a booster unit according hereto incorporated in it. The master cylinder A incorporates a brake fluid reservoir B, pedal C and pipe lines D leading to brake-applying means indicated at E. A booster unit according hereto is indicated at F.

FIGS. 3, 4 and 5 are views similar to FIG. 2, respectively showing three slightly modified arrangements.

FIG. 6 repeats a portion of FIG. 5 on a somewhat enlarged scale.

Figure 7:
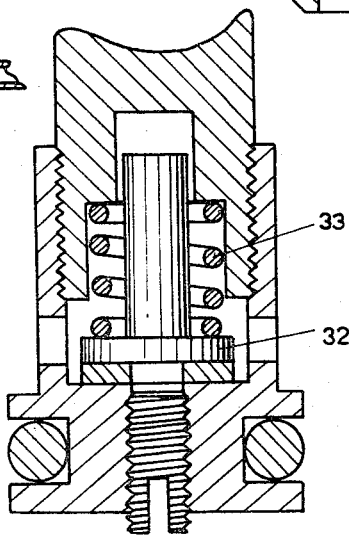

FIG. 7 is a fragmentary view showing a modified form of by-pass valve.

Figure 8:
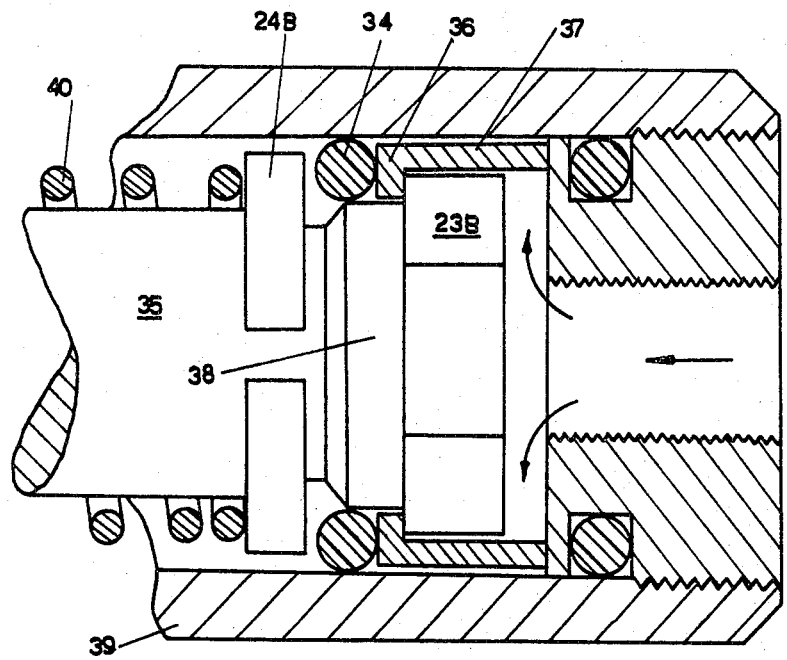

FIG. 8 is a fragmentary view showing another modified form of by-pass valve when closed.

Figure 9:
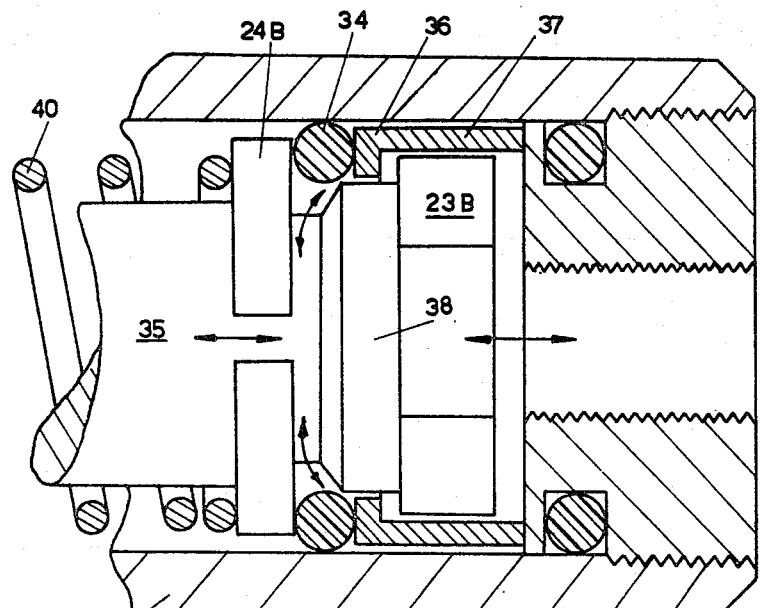

FIG. 9 repeats FIG. 8 with the by-pass valve open.

FIGS. 10 and 11 respectively show further modified forms of by-pass valve.

Figure 1:
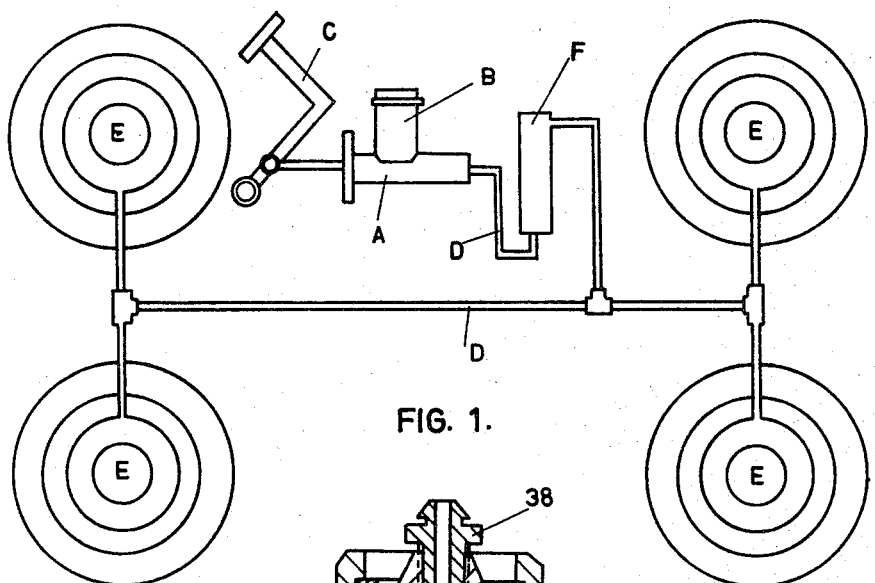
Figure 2:
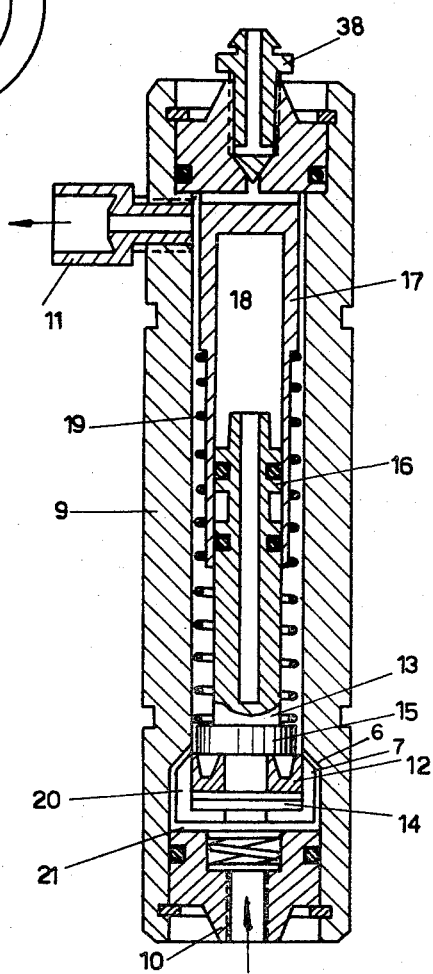
FIG. 2 is a medial cross-section through a booster unit such as that indicated at F in FIG. 1.
Figure 2A:
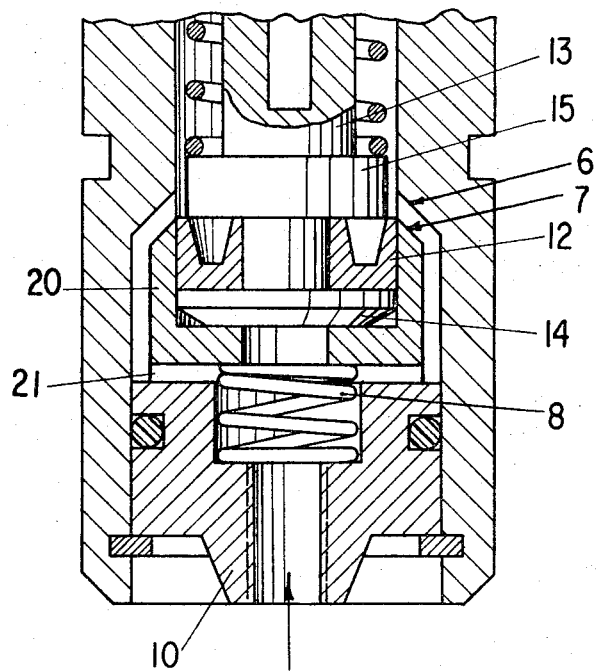
FIG. 2a is a fragmentary view of the lower portion of FIG. 2 on an enlarged scale.

In FIG. 2 the operating cylinder 9 has its inner end portion adapted for pipe-connection to the master cylinder by way of plug 10, and its outer end portion adapted for pipe-connection to the brake-applying means by way of a nipple 11. As shown in FIG. 2a a first piston is constituted by a seal cup-ring 12 on piston rod 13 between a backing flange or head 14 and shoulder flange 15. Flanges 14 and 15 are integral with the piston rod 13. Piston rod 13 carries second piston 16 which works inside the second cylinder 17. The space 18 within cylinder 17 (which is closed by piston 16) constitutes the mentioned closed air chamber. The purpose of this chamber is to provide air cushioned brake application, and what may be called an "air spring" for return movement of piston 12. A compression spring 19 is preferably also included to influence the first piston 12 to move towards or remain at the inner end of the operating cylinder 9. The by-pass valve is in the form of an openbottom cup 20 having a diametrical port groove 21 formed in it.

When brake-applying fluid pressure is applied through plug 10 the first piston (12) moves away from plug 10 and by-pass valve 20 necessarily moves with it under the influence of compression spring 8 thus rendering the by-pass valve 20 inoperative by reason of its chambered end 7 seating against cylinder shoulder 6. This seating of valve 20 halts fluid communication between opposite sides of piston 12 so that the braking pressure is then boosted by reason of the area on the "brake" side of the piston being smaller than that on the "master cylinder" side of that piston owing to the presence of the piston rod 13. Fluid pressure is then communicated to the brake-applying means through nipple 11. When brake pedal pressure ceases, the first piston 12 and the valve 20 revert to the position shown in FIG. 2 thus opening the outer end of the operating cylinder to the inner end thereof by way of the space surrounding the by-pass valve 20 and groove 21. This opening action permits air bleeding of the system by removal, or partial removal, of normally tightly-closed plug 38.

Figure 3:
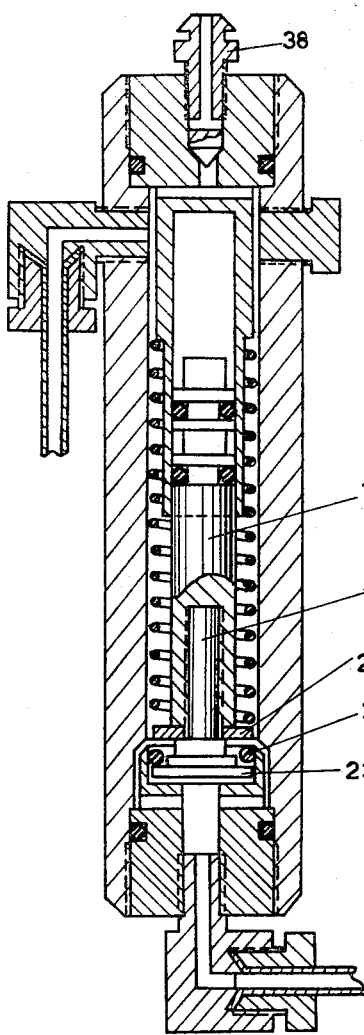

FIG. 3 differs from FIG. 2 mainly in showing a first piston in the form of an O-ring seal 22 instead of a cup-ring such as that (12) in FIG. 2. Seal 22 is disposed between a backing flange or head 23 and shoulder in the form of a washer 24 held in position by being clamped between piston rod portions 13a and 13b tightly screwed together.

Figure 4:
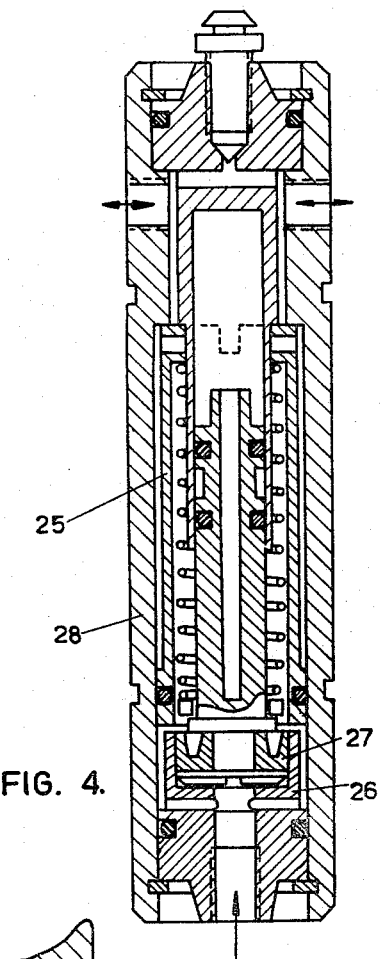

In FIG. 4 a sleeve 25 is included in the operating cylinder 28, which has virtually the same inside diameter as the by-pass valve 26 thus to provide a smooth unstepped path for the piston cup-ring 27 as it moves from the position shown in FIG. 4 towards the outer end portion of the operating cylinder 28.

In FIGS. 5 and 6 the first piston is in the form of an O-ring 22a disposed in a groove flanked by backing flange 23a and a shoulder 24a. The by-pass valve is housed in the first piston and is in the form of a ball 29 loaded by spring 30. Ball 29 is able to close an axial inlet port 31 formed in the body of the first piston.

In FIG. 7 the by-pass valve is in the form of a poppet 32 loaded by spring 33.

In FIGS. 8 and 9 the first piston and the by-pass valve are constituted by parts having functional interrelationship. The first piston is in the form of an O-ring 34 disposed between a shoulder 24b on piston rod 35 and a backing flange 23b in the form of a head on the end of the piston rod. In between the shoulder 24b and backing 23b the annular head 36 of a by-pass valve sleeve 37 is interposed so that O-ring 34 is able to seat against it.

The O-ring 34 is also able to ride upon a stepped shoulder 38 on the piston rod as shown in FIG. 8, so that when the O-ring is in its closed position the O-ring and the parts associated with it act as a piston relative to operating cylinder 39; that is, during outward movement of the piston due to a brake application being made.

When the brake is again relaxed the "air-spring" associated with the piston rod plus the effect of helical spring 40 (if such be provided) will cause inward movement of the piston so that the sleeve 37 will then push the O-ring 34 clear of stepped shoulder 38, as shown in FIG. 9, so to give the required fluid communication past the piston during non-use of the brakes.

In FIG. 10 the first piston consists of O-ring 41 between backing 42 and shoulder 43. The by-pass valve is housed within the piston and consists of O-ring 44 carried in a cup 45 on the guide stem 46 slidable in a bore (not shown) in the piston rod (also not shown). Cup 45 is furnished with a guide stem 47 having an external helical groove 48 to act as a fluid passage.

The arrangement shown in FIG. 11 is virtually the same as that of FIG. 10 except for the fluid passage being in the form of a bore 49 in guide stem 50.

I claim:

1. A booster unit for a brake system of the type described; comprising: an operating cylinder having an inner end portion adapted for pipe connection to the master cylinder of the system and an outer end portion adapted for pipe connection to the brake applying means of the system, a first piston in said operating cylinder disposed between said end portions, a piston rod which at one end carries said first piston and at its other end is formed as a second piston, a second cylinder inside said operating cylinder, said second piston extending into said second cylinder and engaging the circumferential inner wall thereof to form a closed air chamber, and a by-pass valve so associated with said first piston as to permit fluid communication between said end portions during an initial portion of a brake application and to prevent fluid communication between said end portions during the remainder of that application and to permit such communication when the brakes are not being applied.

2. A booster unit according to claim 1 wherein said first piston consists of a backing flange and a shoulder on said piston rod, and a sealing ring therebetween.

3. A booster unit according to claim 2 wherein said sealing ring is a U-section cup-ring.

4. A booster unit according to claim 2 wherein said sealing ring is an O-ring.

5. A booster unit according to claim 2 wherein said piston rod is in two parts one of which is co-axially screwed to the other and said shoulder is a washer clamped between said parts.

6. A booster unit according to claim 1 wherein said by-pass valve is an openbottom cup the wall of which encircles said first piston.

7. A booster unit according to claim 6 wherein said cup has a diametrically ported end face at that end of it adjacent said inner end portion of said operating cylinder.

8. A booster unit according to claim 1 wherein said first piston has an axial duct therethrough and said by-pass valve is a spring-loaded ball housed inside said first piston and able to close said duct.

9. A booster unit according to claim 1 wherein said piston has an axial duct there-through and said by-pass valve is a spring loaded poppet housed within said first piston and able to close said duct.

10. A booster unit according to claim 9 wherein said poppet is in the form of a cup housing an O-ring, and said duct consists of a helical groove on a guide stem on said poppet.

11. A booster unit according to claim 9 wherein said poppet is in the form of a cup housing an O-ring, and said duct consists of an axial bore in a guide stem mounted on said poppet.

12. A booster unit according to claim 1 wherein said first piston and said by-pass valve are constituted by (a) a shoulder on said piston rod (b) a backing flange on said piston rod, (c) an open-ended cup including a skirt which encircles said backing flange and an annular head disposed between said backing flange and said shoulder, (d) a stepped shoulder on said piston rod between said piston rod shoulder and said backing flange and (e) and an O-ring between said piston rod shoulder and said annular head which is able to ride upon said stepped shoulder while bearing against the inner wall of said operating cylinder.

* * * * *